(12) United States Patent
Oike et al.

(10) Patent No.: US 7,258,027 B2
(45) Date of Patent: Aug. 21, 2007

(54) DEVICE FOR DETECTING ABSOLUTE ROTATION ANGLE AND TORQUE

(75) Inventors: Koji Oike, Kyoto (JP); Kiyotaka Uehira, Osaka (JP); Masaharu Ushihara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 4 days.

(21) Appl. No.: 10/528,586

(22) PCT Filed: Aug. 31, 2004

(86) PCT No.: PCT/JP2004/012910
§ 371 (c)(1),
(2), (4) Date: Mar. 21, 2005

(87) PCT Pub. No.: WO2005/024369
PCT Pub. Date: Mar. 17, 2005

(65) Prior Publication Data
US 2006/0042403 A1 Mar. 2, 2006

(30) Foreign Application Priority Data
Sep. 2, 2003 (JP) .............................. 2003-309794

(51) Int. Cl.
*G01L 3/00* (2006.01)
(52) U.S. Cl. ................................................. 73/862.331
(58) Field of Classification Search ........... 73/862.331, 73/862.333
See application file for complete search history.

(56) References Cited

U.S. PATENT DOCUMENTS

| | | | |
|---|---|---|---|
| 5,930,905 A | 8/1999 | Zabler et al. | |
| 6,578,437 B1 | 6/2003 | Moerbe | |
| 6,880,254 B2 * | 4/2005 | Uehira et al. ............... | 33/1 PT |
| 6,935,195 B2 * | 8/2005 | Tokumoto et al. ..... | 73/862.334 |
| 6,948,382 B2 * | 9/2005 | Sakai et al. ............ | 73/862.326 |
| 6,957,590 B2 * | 10/2005 | Maeda et al. .......... | 73/862.334 |
| 6,987,384 B2 * | 1/2006 | Uehira et al. .......... | 324/207.05 |
| 6,988,421 B2 * | 1/2006 | Tokumoto .............. | 73/862.333 |
| 2003/0145663 A1 | 8/2003 | Heisenberg et al. | |
| 2003/0155627 A1 | 8/2003 | Fukaya et al. | |

FOREIGN PATENT DOCUMENTS

| | | |
|---|---|---|
| DE | 198 34 322 | 2/2000 |
| DE | 100 60 287 A1 | 6/2001 |
| EP | A2 0 338 559 | 10/1989 |
| JP | 05-231968 | 9/1993 |
| JP | 10-142082 | 5/1998 |
| WO | 00/08434 | 2/2000 |

* cited by examiner

*Primary Examiner*—Michael Cygan
*Assistant Examiner*—Octavia Davis
(74) *Attorney, Agent, or Firm*—Wenderoth, Lind & Ponack, L.L.P.

(57) ABSTRACT

A detector of an absolute rotation angle and torque includes a first gear coupled to an input shaft of a torsion-bar unit, a gear A engaging with the first gear, and a first detecting section of an absolute rotation angle placed at the center of the gear A. The detector also includes a second gear coupled to an output shaft of the torsion-bar unit, a gear B engaging with the second gear, and a second detecting section of an absolute angle placed at the center of gear B.

7 Claims, 4 Drawing Sheets

Absolute rotation angle of first gear 1 and second gear 3

US 7,258,027 B2

DEVICE FOR DETECTING ABSOLUTE ROTATION ANGLE AND TORQUE

This application is a U.S. National Phase Application of PCT International Application PCT/JP04/012910.

TECHNICAL FIELD

The present invention relates to a detector, mounted to a torsion bar, for detecting an absolute rotation angle and torque simultaneously. The detector of the present invention is used in a power steering of cars.

BACKGROUND ART

FIG. 6 shows a conventional detector of a rotation angle and torque. Gear 18 is mounted to an input shaft (not shown) of a torsion bar. Gear 21 engaging with gear 18 includes round-shaped code plate 20 having numbers of magnetic poles. Code plate 20 rotates following the rotation of the input shaft. Detecting element 22 of magnetism counts the number of poles rotating, thereby detecting a rotation angle of the input shaft. Gear 42 is mounted to an output shaft (not shown) of the torsion bar, and detects a rotation angle of the output shaft in the same manner as discussed above. When torque works to the torsion bar, thereby producing torsion on the shaft, a comparison of rotation angles between the input shaft and the output shaft will detect the torque.

However, a more accurate rotation angle requires code plate 20 to have greater numbers of poles, so that the dimensions of the detector will become greater. Placement of detecting elements 22 in a radius direction on code plate 20 will also enlarge the detector. The conventional detector discussed above cannot detect an absolute rotation angle.

SUMMARY OF THE INVENTION

A detector of the present invention comprises the following elements:
 a torsion-bar unit including an input shaft, an output shaft, and a torsion bar;
 a first gear coupled to the input shaft;
 gear A engaging with the first gear;
 a first detecting section, placed at the center of gear A, for detecting an absolute rotation angle;
 a second gear coupled to the output shaft;
 gear B engaging with the second gear; and
 a second detecting section, placed at the center of gear B, for detecting an absolute angle.

DETAILED DESCRIPTION OF THE INVENTION

An exemplary embodiment of the present invention is demonstrated hereinafter with reference to the accompanying drawings.

Figure 1:
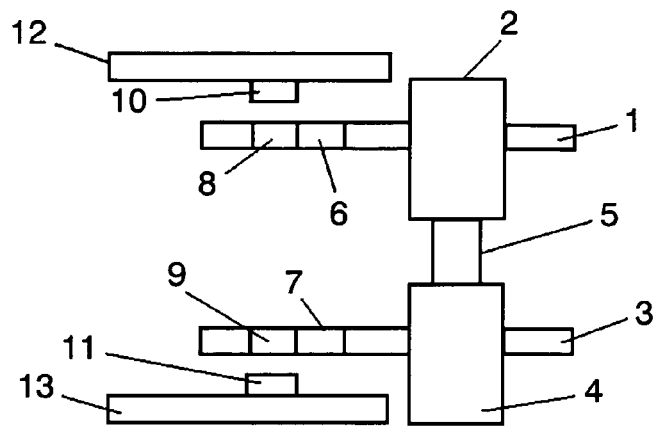
FIG. 1 shows a structure of a detector of an absolute rotation angle and torque in accordance with an exemplary embodiment of the present invention.

FIG. 1 shows a structure of a detector of an absolute rotation angle and torque in accordance with an exemplary embodiment of the present invention. A torsion-bar unit is formed of input shaft 2, torsion bar 5 and output shaft 4, wherein these elements are made of the same rigid body and placed concentrically. First gear 1 and second gear 3 are coupled to input shaft 2 and output shaft 4 respectively. First gear 1 engages with gear A6, and second gear 3 engages with gear B7. Gear A6 has first magnet 8 at its center, and gear B7 has second magnet 9 at its center. First magnet 8 and second magnet 9 are magnetized in one pole pair. Board 12 has first detecting element 10 of magnetism confronting first magnet 8, and board 13 has second detecting element 11 of magnetism confronting second magnet 9. First magnet 8 and first detecting element 10 form a first detecting section of an absolute rotation angle. Second magnet 9 and second detecting element 11 form a second detecting section of an absolute rotation angle. First gear 1 and second gear 3 have the same number of teeth "c", gear A6 has the number of teeth "a", and gear B7 has the number of teeth "b" (a≠b).

Next, an absolute rotation angle of first gear 1 and second gear 3 as well as torque applied to torsion bar 5 are described.

In FIG. 1, rotation of input shaft 2 of the torsion-bar unit causes first gear 1 and gear A6 to rotate. First detecting element 10 detects a magnetic field of first magnet 8, thereby calculating an absolute rotation angle of gear A6. Rotation of output shaft 4 causes second gear 3 and gear B7 to rotate. Second detecting element 11 detects a magnetic field of second magnet 9, thereby calculating an absolute rotation angle of gear B7.

Figure 2:
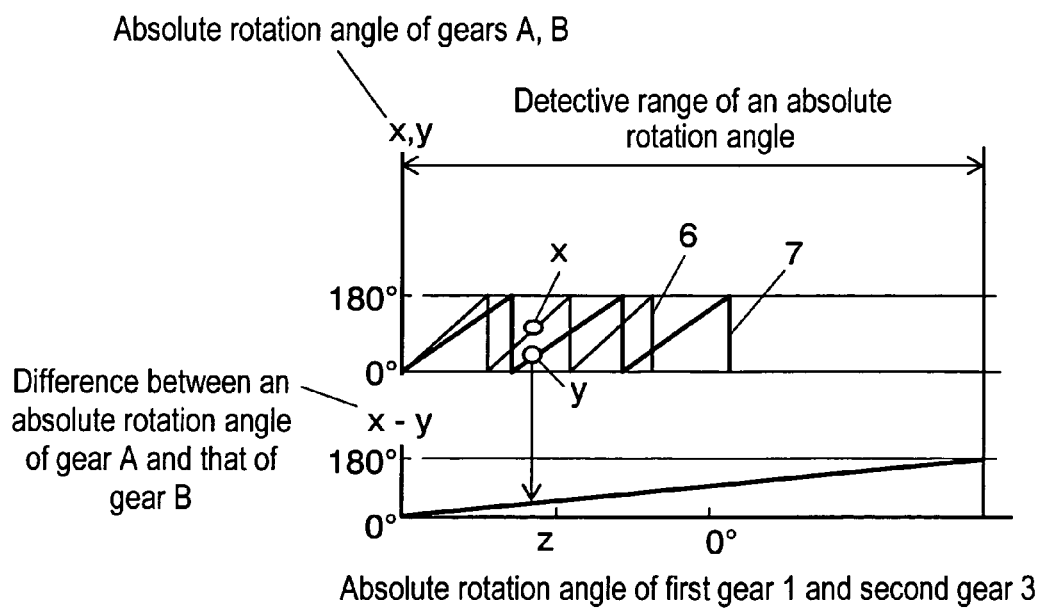
FIG. 2 shows schematically how to find an absolute rotation angle.

FIG. 2 depicts a method of calculating an absolute rotation angle. The lateral axis represents absolute rotation angle "z" of first gear 1 and second gear 3. The upper column shows absolute rotation angles "x" and "y" of gear A6 and gear B7 respectively. The lower column shows a difference "x−y" between the absolute rotation angles of gear A6 and gear B7. As shown in FIG. 2, the difference "x−y" forms a straight line and is uniquely related to absolute rotation angle "z", which can be thus calculated from the difference "x−y".

Figure 3:
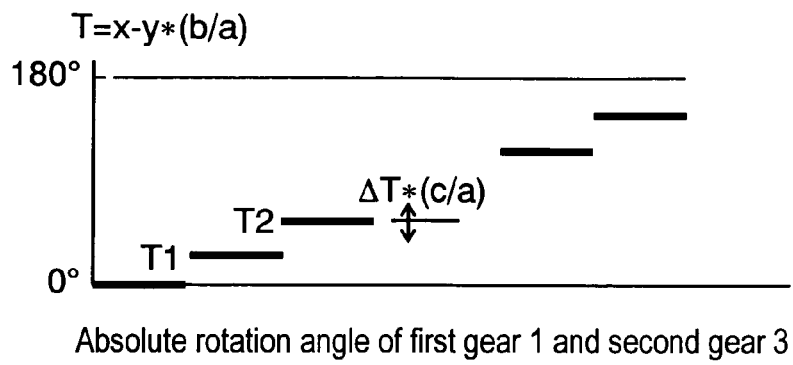
FIG. 3 shows schematically how to find a torsion angle.

The ordinate axis of FIG. 3 shows difference T which is found from the following equation: T=x−y b/a When torsion bar 5 does not have torsion, difference T changes step by step as shown in FIG. 3. If torsion bar 5 produces torsion ΔT, difference T changes by ΔT (c/a) with respect to the case where no torsion is produced, so that torsion angle ΔT can be calculated. This ΔT*(c/a) is added to (x−y) shown in FIG. 2, so that a detection accuracy of absolute rotation angle "z" can be improved. Torque can be calculated using torsion angle ΔT. When torsion angle ΔT exceeds a given allowance, the detector determines that an abnormality occurs and gives a warning.

An absolute rotation angle and torque can be also detected in the condition of gear A6 and gear B7 having the same number of teeth, and first gear 1 having a different number of teeth from that of second gear 3.

Figure 4:
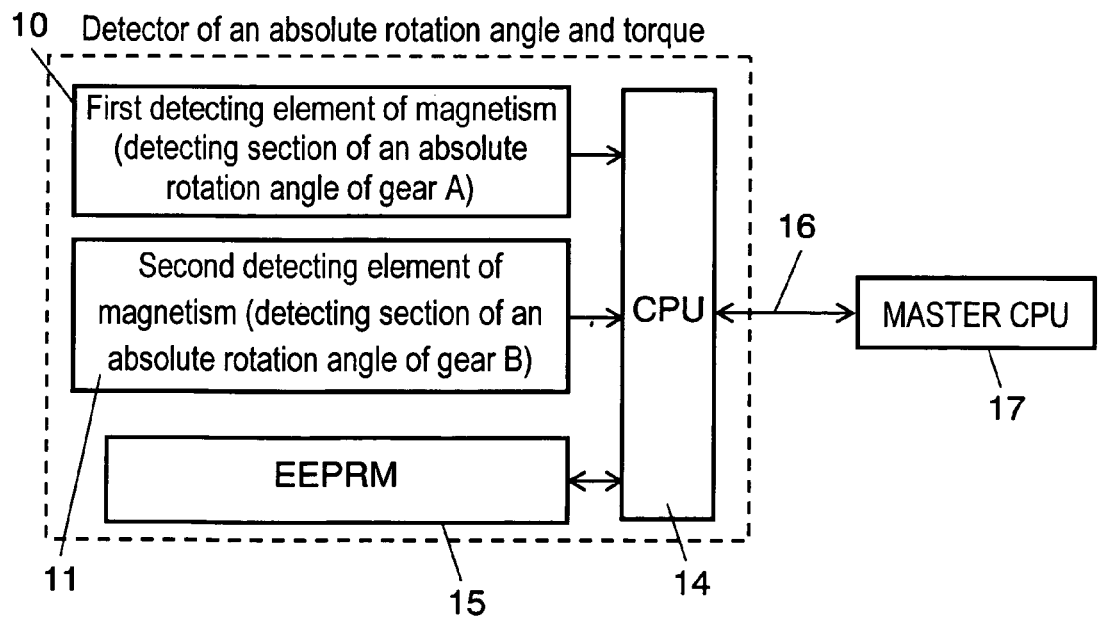
FIG. 4 shows a block diagram of a detector in accordance with an exemplary embodiment of the present invention.

As shown in FIG. 4, first detecting element 10 and second detecting element 11 are coupled to CPU 14, to which non-volatile memory EEPROM 15 is also coupled. On the other hand, CPU 14 is coupled to master CPU 17 via serial communication line 16 in order to output an absolute rotation angle and torque calculated by CPU 14.

It is desirable to mount gear A6 and gear B7 with respective positions of zero-rotation angle of both the gears being agreed with each other; however, it requires such elaborate work that the following correction of zero-rotation angle takes the place of the work: Gear A6 and gear B7 are mounted to the torsion-bar unit, then an initial absolute rotation angle of gear A6 is calculated using a signal supplied from first detecting element 10, and that of gear B7 is calculated using a signal supplied from second detecting element 11. Those angles calculated are stored in EEPROM 15, and every time the power is turned on, the angles are read from EEPROM 15. A rotation angle starting from each one those initial absolute rotation angles is defined as respective absolute rotation angles of gear A6 and gear B7.

Figure 5:
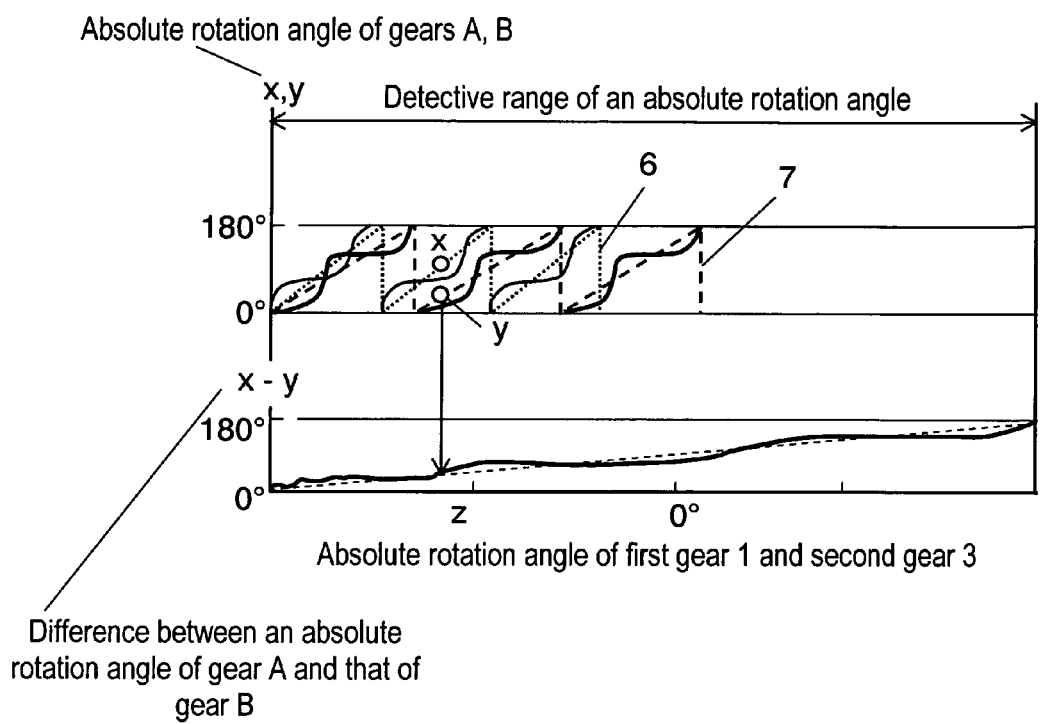
FIG. 5 shows schematically how to correct an error.
Figure 6:
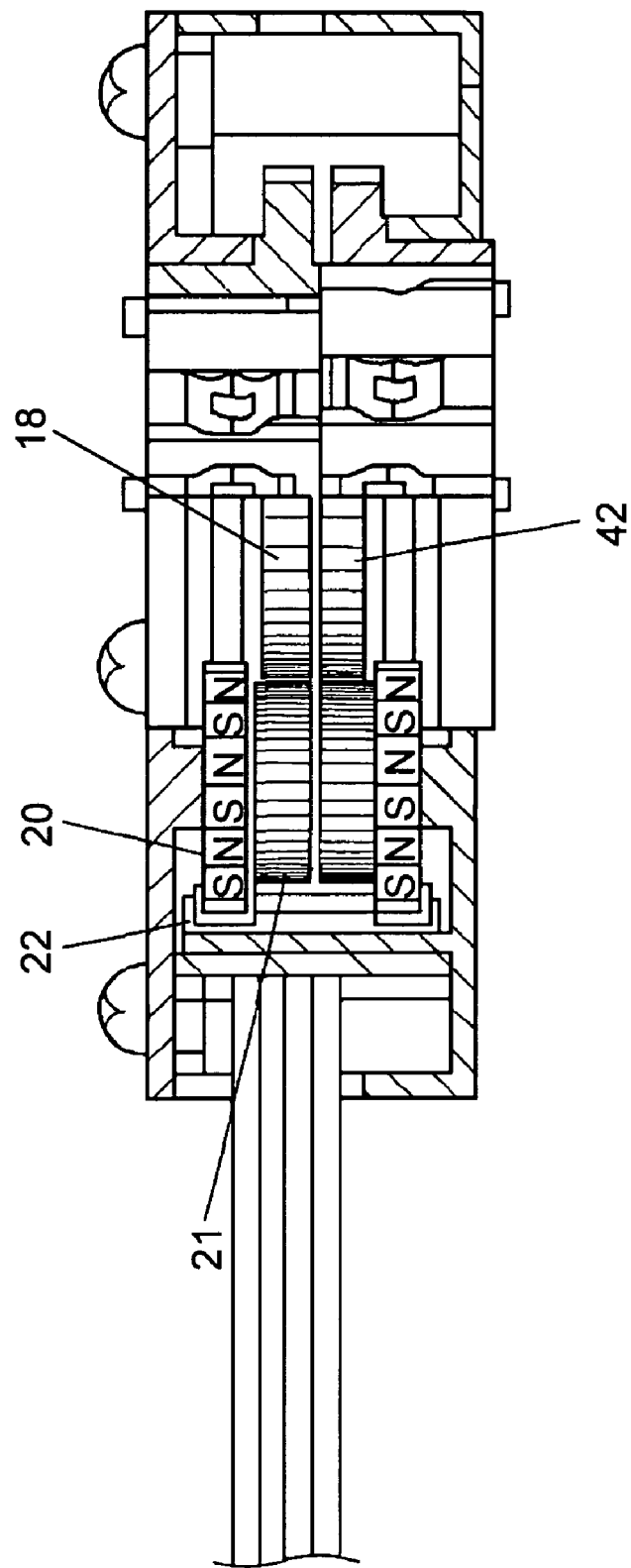
FIG. 6 shows a conventional detector of a rotation angle and torque.

Further, as shown in FIG. 5, absolute rotation angles (shown in solid lines) calculated by the detecting elements include errors due to a variety of factors with respect to respective correct absolute rotation angles (shown in broken lines), so that the following correction is provided: Gear A6 and gear B7 are mounted to the torsion-bar unit, then input shaft 2 is rotated with high accuracy, thereby obtaining a correction angle that is a difference between the correct absolute rotation angles and the absolute rotation angles of gear A6 and gear B7 calculated by the detecting elements. This correction angle is stored in EEPROM 15, and every time the power is turned on, this correction angle is read and added to the angles calculated by the detecting elements, so that an absolute rotation angle approximate to the correct one is obtainable.

INDUSTRIAL APPLICABILITY

The detector of an absolute rotation angle and torque is suited to a power steering of cars.

The invention claimed is:

1. A detector of an absolute rotation angle and torque, the detector comprising:
    a torsion-bar unit including an input shaft, an output shaft and a torsion bar;
    a first gear coupled to the input shaft;
    a gear A engaging with the first gear;
    a first detecting section for detecting an absolute rotation angle of the gear A;
    a second gear coupled to the output shaft;
    a gear B engaging with the second gear; and
    a second detecting section for detecting an absolute rotation angle of the gear B,
    wherein the first detecting section includes a first magnet and a first detecting element of magnetism confronting the first magnet,
    wherein the second detecting section includes a second magnet and a second detecting element of magnetism confronting the second magnet,
    wherein the first magnet is disposed at a center of the gear A, and
    wherein the second magnet is disposed at a center of the gear B.

2. The detector of an absolute rotation angle and torque of claim 1,
    wherein the first and the second gears have an identical number of teeth, and the gear A has a different number of teeth from that of the gear B,
    wherein an absolute rotation angle is calculated from a difference between the respective absolute rotation angles of the gear A and the gear B, and
    wherein torque is calculated from a difference between the absolute rotation angle of the gear A and that of the gear B multiplied by the teeth ratio of the gear A vs. the gear B.

3. The detector of an absolute rotation angle and torque of claim 1,
    wherein the first gear has a different number of teeth from that of the second gear, and the gear A and the gear B have an identical number of teeth,
    wherein an absolute rotation angle is calculated from a difference between respective absolute rotation angles of the gear A and the gear B, and
    wherein torque is calculated from a difference between the absolute rotation angle of the gear A and that of the gear B multiplied by the teeth ratio of the first gear vs. the second gear.

4. The detector of an absolute rotation angle and torque of claim 2,
    wherein respective initial absolute rotation angles of the gear A and the gear B are stored in advance in a nonvolatile memory, and
    wherein rotation angles starting from the initial absolute rotation angles stored in the nonvolatile memory are regarded as respective absolute rotation angles of the gear A and the gear B and are used for calculating an absolute rotation angle and torque.

5. The detector of an absolute rotation angle and torque of claim 2,
    wherein a correction angle is stored in a nonvolatile memory in advance, the correction angle being a respective difference between correct absolute rotation angles of the gears A, B and the absolute rotation angles calculated by the first and the second detecting elements of magnetism, and
    wherein each of the correction angles stored in the nonvolatile memory are added to the respective absolute rotation angles calculated by the first and the second detecting elements of magnetism, and the angles added are regarded as respective absolute rotation angles of the gear A and the gear B and are used for calculating an absolute rotation angle and torque.

6. The detector of an absolute rotation angle and torque of claim 2,
    wherein the detector provides a warning of an abnormality when a difference between the absolute rotation angle of the gear A and the absolute rotation angle of the gear B multiplied by teeth ratio of the gear A vs. the gear B exceeds a predetermined allowance.

7. The detector of an absolute rotation angle and torque of claim 3,
    wherein the detector provides a warning of an abnormality when a difference between the absolute rotation angle of the gear A and the absolute rotation angle of the gear B multiplied by a teeth ratio of the first gear vs. the second gear exceeds a predetermined allowance.

* * * * *